(12) United States Patent
Magri

(10) Patent No.: US 7,046,923 B2
(45) Date of Patent: May 16, 2006

(54) IMMERSION HEATER DEVICE FOR AQUARIUMS AND THE LIKE

(75) Inventor: Sergio Magri, Bourlingster (LU)

(73) Assignee: Contech Europe Holding S.A., Place Dargent (LU)

( * ) Notice: Subject to any disclaimer, the term of this patent is extended or adjusted under 35 U.S.C. 154(b) by 0 days.

(21) Appl. No.: 10/521,802

(22) PCT Filed: Jul. 18, 2003

(86) PCT No.: PCT/IB03/02890

§ 371 (c)(1),
(2), (4) Date: Jan. 21, 2005

(87) PCT Pub. No.: WO2004/008846

PCT Pub. Date: Jan. 29, 2004

(65) Prior Publication Data

US 2005/0242080 A1    Nov. 3, 2005

(30) Foreign Application Priority Data

Jul. 22, 2002  (IT)  .......................... PD2002A0200

(51) Int. Cl.
*H05B 3/40* (2006.01)

(52) U.S. Cl. ...................... 392/497; 219/501; 219/523; 392/498

(58) Field of Classification Search .................... None
See application file for complete search history.

(56) References Cited

U.S. PATENT DOCUMENTS

| | | | | |
|---|---|---|---|---|
| 5,834,742 A | * | 11/1998 | Yoshida | 219/523 |
| 5,905,849 A | * | 5/1999 | Ito | 392/498 |
| 6,061,500 A | * | 5/2000 | Su | 392/498 |
| 6,097,007 A | * | 8/2000 | Wang | 219/501 |
| 6,584,280 B1 | * | 6/2003 | Wang | 392/498 |

FOREIGN PATENT DOCUMENTS

FR     2401585     3/1979

* cited by examiner

*Primary Examiner*—Thor S. Campbell
(74) *Attorney, Agent, or Firm*—Stradley Ronon Stevens & Young, LLP

(57) ABSTRACT

An immersion heater device for aquariums and the like. The heater device has a casing which contains a heating element. The casing, at least in the region of a radiant zone of the heating element, includes a layered structure having at least one layer of metal material and one layer of plastic material. The layer of metal material is interposed between the heating element and the layer of plastic material.

20 Claims, 2 Drawing Sheets

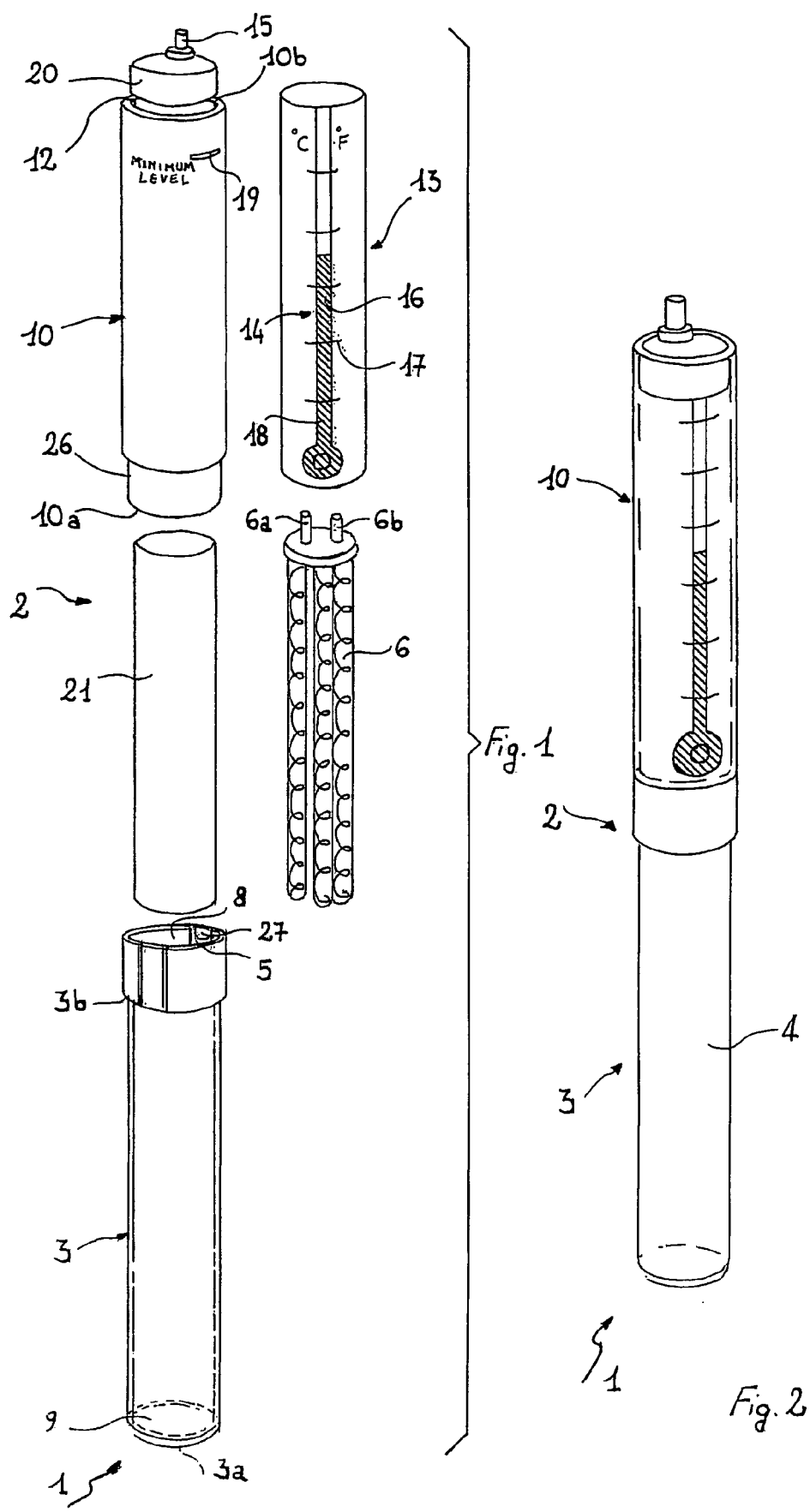

IMMERSION HEATER DEVICE FOR AQUARIUMS AND THE LIKE

TECHNICAL FIELD OF THE INVENTION

The present invention relates to an immersion heater device for aquariums and the like.

TECHNOLOGICAL BACKGROUND OF THE INVENTION

Immersion heater devices of the above-described type are mainly used, though not exclusively, for regulating the temperature of water inside aquariums so as to reproduce the conditions of the natural habitat of fishes placed therein.

These devices, which are generally supplied with electrical energy, must comply with strict safety provisions since they are potentially handled by the user during the normal maintenance of the aquarium. In particular, the standards in force in some countries require that the elements of the devices be subjected to various strength and resistance tests, such as mechanical strength (for example, resistance to collisions or impacts) and heat resistance (for example, resistance to thermal shock), therefore imposing very precise structural features.

Most of the known devices comprise a glass casing in contact with the water, containing the electrical resistor which can heat the water by radiation. However, glass presents some disadvantages, such as the possibility of being easily broken as a result both of accidental collisions against elements placed inside the aquarium (such as stones, rocks, etc.) and thermal shocks produced, for example, by the immersion in water of a device, a device which has accidentally been left switched on out of the water, or by filling the aquarium with cold water. In order to prevent breakages due to thermal shock, safety thermostats are generally provided in the glass devices; these interrupt the energy supply of the resistor when a particular predetermined temperature value is reached at the surface of the casing. However, the provision of such a thermostat, in order to ensure correct operation of the device when it is immersed in water, involves an increase in the longitudinal dimensions of the casing, making the device costly and bulky.

There are also known heating devices which have a metal casing, but which need to be grounded to earth in order to comply with the safety standards, and which further involve a high cost in comparison with the glass devices due to the material used.

An example of this prior art is disclosed in FR-A-2401585.

Finally, a device having a casing of plastic material is known from Italian Patent No. 1300229. This device has never been marketed, however, since it is not suitable for withstanding high temperatures, such as, for example, those reached by the device should it remain live out of the water, at which temperatures the plastic material softens. It is possible to overcome this disadvantage by producing the casing from heat-resistant plastic materials, such as thermo-resistant resins, which have the disadvantage, however, of high cost.

SUMMARY OF THE INVENTION

The problem addressed by the present invention is to provide an immersion heater device for aquariums and the like which is structurally and operationally designed to overcome the limitations set out above with reference to the prior art cited.

This problem is solved by the present invention by providing an immersion heater device for aquariums and the like having a casing which contains a heating element. The casing, at least in the region of a radiant zone of the heating element, includes a layered structure having at least one layer of metal material and one layer of plastic material. The layer of metal material is interposed between the heating element and the layer of plastic material. Each of the layer of metal material and the layer of plastic material is in the form of a cylindrical tubular element. The tubular element of plastic material is closed at one end and open at an axially opposite end while the tubular element of metal material is open at both ends.

It is to be understood that both the foregoing general description and the following detailed description are exemplary, but are not restrictive, of the invention.

BRIEF DESCRIPTION OF THE DRAWINGS

The features and advantages of the invention will be better appreciated from the description below of one preferred embodiment which is illustrated purely by way of non-limiting example with reference to the appended drawings. It is emphasized that, according to common practice, the various features of the drawings are not to scale. On the contrary, the dimensions of the various features are arbitrarily expanded or reduced for clarity. Included in the drawings are the following figures:

FIG. 1 is an exploded view of an immersion heater device produced according to the invention;

FIG. 2 is a perspective view of the heater device of FIG. 1;

DETAILED DESCRIPTION OF THE INVENTION

Figures 3, 4:
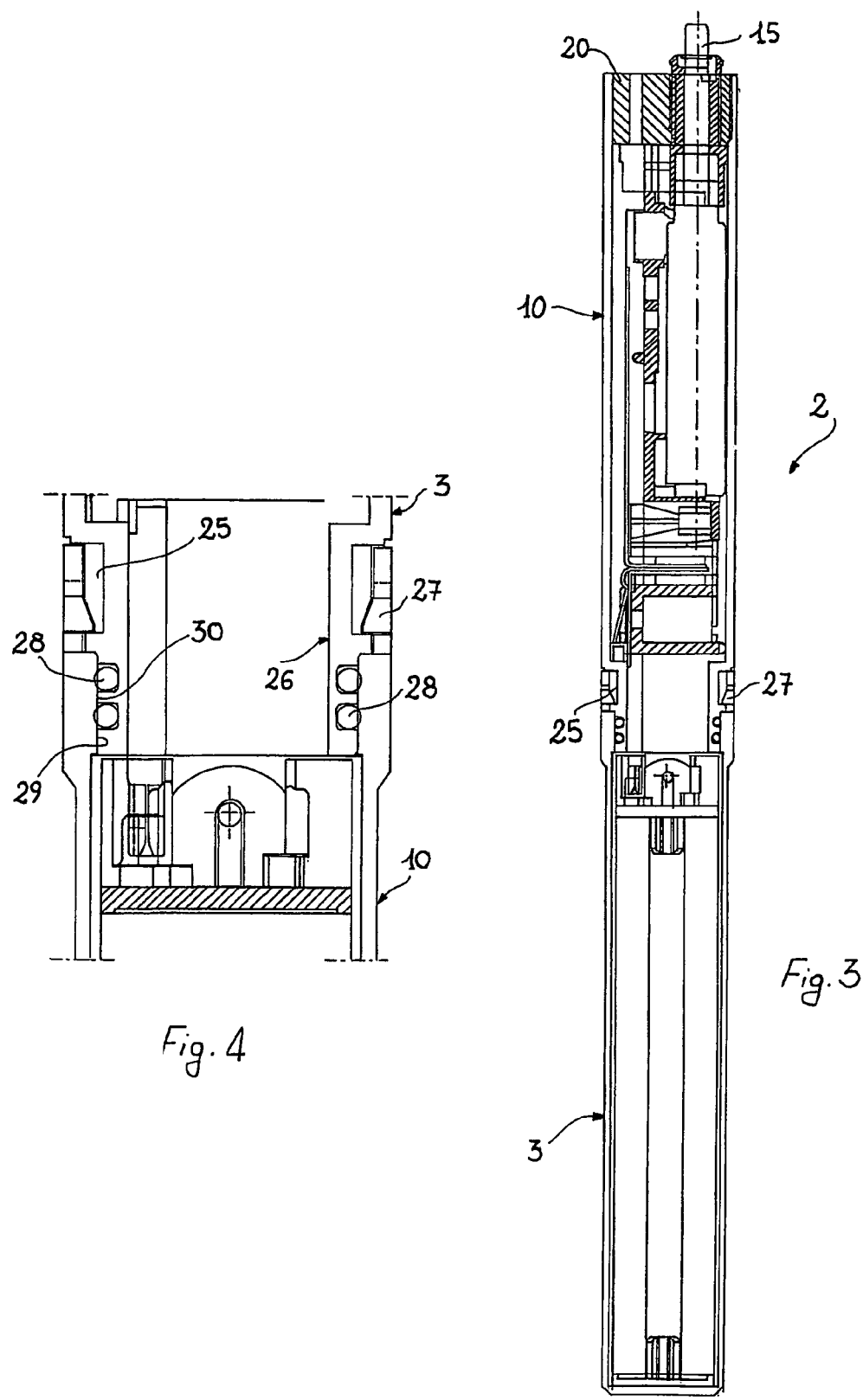
FIG. 3 is a sectioned side view of the heater device of FIG. 1.
FIG. 4 is a sectioned view to an enlarged scale of a detail of the heater device of FIG. 1.

With reference to the figures, in which like reference numbers refer to like elements throughout the various figures, an immersion heater device for aquariums and the like which is produced according to the present invention is generally indicated by the reference number 1.

The heater device 1 comprises a casing 2 which includes a first tubular element 3, having a cylindrical tubular form which is closed at one end 3a and which is open at the axially opposite end 3b, and which defines an outer surface 4 of the heater device 1 which can be placed in contact with water.

There is further defined inside the first tubular element 3 a space 5 which can house a heating element 6, in particular one or more electrical resistors, which, when supplied with current, produce the heat necessary for heating the water of the aquarium, in which the heater device 1 is immersed.

The heating element 6, which is of cylindrical form and which is arranged coaxially relative to the first tubular element 3, comprises, at one end thereof, two electrical contacts 6a, 6b for the electrical connection thereof to an energy supply (not illustrated and known per se).

According to a principal feature of the invention, the first tubular element 3 comprises a layered structure which is formed by a first metal layer 8 and by a second layer of plastic material 9. In particular, the metal layer 8 is interposed between the layer of plastic material 9 and the heating element 6 so that the heat produced thereby is diffused in a uniform manner by the metal layer 8 and the layer of plastic material 9 does not reach excessively high temperatures, which would lead to the melting or softening thereof.

The metal layer 8, which is preferably produced from aluminum, completely surrounds the heating element 6 forming a continuous wall and is of tubular form. The longitudinal extent thereof is equal to or greater than the longitudinal extent of the heating element 6 so as to cover it and completely shield all of the radiating surface thereof.

The layer of plastic material 9 is preferably produced from resin which is reinforced with glass fiber, preferably polyamide 6; 6,6; or 12.

There is further provision for interposing, between the heating element 6 and the metal layer 8, a third layer 21 of heat-resistant, electrically insulating material, for example, of mecanite, on a vitreous or silicon support, in order to prevent short-circuits caused by accidental contacts between the electrical resistor and the metal layer 8. As an alternative, the heating element 6 may be produced from insulating material, such as a ceramic support, and may comprise tubular slots in which the electrical resistors are received with complete electrical insulation from the metal layer 8.

The casing 2 further comprises a second tubular element 10 having a cylindrical form which is open at both of the two axially opposite ends 10*a*, 10*b* thereof. The tubular element 10 is advantageously produced from a transparent plastic material, for example, polyamide, and can be connected at one end 10*a* thereof to the open end 3*b* of the first tubular element 3.

The joint between the first tubular element 3 and the second tubular element 10 is produced by a mechanical form-fit having a form comprising a plurality of undercut recesses 25 in the outer surface of the second tubular element 10 in the region of an annular narrowing 26 at the end 10*a* thereof. A corresponding plurality of engaging teeth 27, which project axially from the first tubular element 3, are snap-fitted in the recesses 25.

A leak-tight seal is achieved by placing annular seals 28 between mutually fitting portions 29, 30 at the end 10*a* of the second tubular element 10 and at the end 3*b* of the first tubular element 3, respectively. This mechanical connection is of the permanent type since it cannot be released without suitable tools.

A threaded joint is also suitable for the leak-tight mechanical connection.

As an alternative and/or in addition, the mechanical sealing can be achieved using ultrasonic welding. It should be noted that, if both the first tubular element 3 and the second tubular element 10 are produced from polyamide, these elements are compatible with each other from the point of view of welding.

The free end 10*b* of the second tubular element 10 is then closed in a leak-tight manner by a plug 20.

A space 12 defined in the second tubular element 10 receives a thermostat 13 for regulating the temperature of the water inside the aquarium. The thermostat 13 itself comprises a mechanism 14 for setting the temperature which is controlled by a rotatable knob 15 positioned on top of the plug 20.

The temperature-setting mechanism 14 comprises a window 16, at the edges of which a scale 17 graduated, for example, in ° C. and/or ° F., is depicted and inside which a column-type indicator 18 is positioned.

The space 12 further receives a mechanism for limiting the temperature (not illustrated), including another thermostat for interrupting the energy supply to the heating element 6 in the event that the temperature of the first tubular element 3 or the second tubular element 10 exceeds a given limit value.

When in use, the heater device 1 is immersed in water as far as a level indicated by a mark 19 made on the second tubular element 10 near the end 10*b* thereof.

By rotating the knob 15 as described above, the desired temperature is set. The water is brought to the predetermined temperature by radiation from the electrical resistor of the heating element 6.

The heat radiated by the resistor, which can reach temperatures of the order of from 200 to 300° C., is diffused in a substantially uniform manner by the metal layer 8 and therefore reduces the temperature to from 50 to 100° C. in the interface zone with the layer of plastic material 9. The layer of plastic material 9 further acts as electrical insulation and it is therefore unnecessary to provide an earth ground for the heater device 1.

Therefore, the invention solves the problem addressed by allowing a number of advantages over the prior art referred to.

A first advantage provided by the device according to the invention is that of extreme safety provided by a casing which is produced from plastic material and which is therefore particularly resistant to collisions and thermal shocks and which, due to the provision of the metal layer, can also be used at high temperatures without softening.

The provision of the metal layer also imparts to the device greater mechanical strength than a device of plastic material or glass.

The metal layer further allows correct and uniform operation of the safety thermostat.

Not least, the provision of a casing of plastic material allows simple production thereof in a great variety of shapes and forms.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. An immersion heater device for aquariums, comprising:
   a heating element having a radiant zone;
   a casing containing the heating element and including, at least in the region of the radiant zone of the heating element, a layered structure having at least one layer of metal material and one layer of plastic material, the layer of metal material being interposed between the heating element and the layer of plastic material, each of the layer of metal material and the layer of plastic material being in the form of a cylindrical tubular element, wherein the tubular element of plastic material is closed at one end and open at an axially opposite end while the tubular element of metal material is open at both ends.

2. The heater device according to claim 1, wherein the layered structure comprises a layer of insulating material.

3. The heater device according to claim 1, wherein the layer of plastic material and the layer of metal material are in contact with each other.

4. The heater device according to claim 3, wherein the layer of metal material and the layer of plastic material completely surround the heating element.

5. The heater device according to claim 4, wherein the layer of metal material and the layer of plastic material constitute a continuous wall.

6. The heater device according to claim 2, wherein the layer of insulating material is interposed between the layer of metal material and the heating element.

7. The heater device according to claim 1, wherein the layer of metal material is produced from aluminum.

8. The heater device according to claim 1, wherein the layer of plastic material is produced from resin reinforced with glass fiber.

9. The heater device according to claim 8, wherein the resin is polyamide.

10. The heater device according to claim 2, wherein the layer of insulating material is produced from mecanite or ceramic material.

11. The heater device according to claim 1, wherein the casing comprises a second tubular element which is connected to a first tubular element having the layered structure, the second tubular element defining two axially opposite ends which are both open.

12. The heater device according to claim 11, further comprising a mechanical connection engaging the second tubular element, with a seal interposed, to the first tubular element having a layered structure.

13. The heater device according to claim 12, wherein the mechanical connection between the tubular elements is of the permanent type.

14. The heater device according to claim 12, further comprising a thermostat adapted to regulate the temperature of the water of the aquarium, which thermostat is housed in the second tubular element.

15. The heater device according to claim 11, wherein the second tubular element is produced from transparent plastic material.

16. The heater device according to claim 1, further comprising means for limiting the temperature by interrupting an energy supply to the heating element in the event that the temperature of the casing exceeds a pre-set limit value.

17. An immersion heater device for aquariums, comprising:
a heating element having an energy supply and a radiant zone;
a casing containing the heating element and including:
(a) at least in the region of the radiant zone of the heating element, a first tubular element with a layered structure having a layer of insulating material and at least one layer of metal material and one layer of plastic material, the layer of metal material being interposed between the heating element and the layer of plastic material, each of the layer of metal material and the layer of plastic material being in the form of a cylindrical tubular element, the tubular element of plastic material being closed at one end and open at an axially opposite end while the tubular element of metal material is open at both ends, and
(b) a second tubular element connected to the first tubular element and defining two axially opposite ends which are both open; and
means for limiting the temperature by interrupting the energy supply to the heating element in the event that the temperature of the casing exceeds a pre-set limit value.

18. The immersion heater device according to claim 17 wherein the layer of plastic material and the layer of metal material are in contact with each other.

19. The immersion heater device according to claim 17 wherein the layer of metal material is produced from aluminum and the layer of plastic material is produced from resin reinforced with glass fiber.

20. An immersion heater device for aquariums, comprising:
a heating element having an energy supply and a radiant zone;
a casing containing the heating element and including:
(a) at least in the region of the radiant zone of the heating element, a first tubular element with a layered structure having a layer of insulating material and a continuous wall formed of at least one layer of metal material produced from aluminum and one layer of plastic material produced from resin reinforced with glass fiber, the layer of insulating material being interposed between the layer of metal material and the heating element, the layer of metal material being interposed between the heating element and the layer of plastic material, each of the layer of metal material and the layer of plastic material being in the form of a cylindrical tubular element and being in contact with each other while completely surrounding the heating element, the tubular element of plastic material being closed at one end and open at an axially opposite end while the tubular element of metal material is open at both ends, and
(b) a second tubular element produced from transparent plastic material and defining two axially opposite ends which are both open;
a mechanical connection engaging the second tubular element, with a seal interposed, to the first tubular element having a layered structure;
a thermostat adapted to regulate the temperature of the water of the aquarium and housed in the second tubular element; and
means for limiting the temperature by interrupting the energy supply to the heating element in the event that the temperature of the casing exceeds a pre-set limit value.

* * * * *